(12) United States Patent
Wang et al.

(10) Patent No.: US 11,668,995 B2
(45) Date of Patent: Jun. 6, 2023

(54) OPTICAL COMPENSATION METHOD FOR DISPLAY SCREEN, STORAGE MEDIUM, AND ELECTRONIC DEVICE

(71) Applicants: Chengdu BOE Optoelectronics Technology Co., Ltd., Sichuan (CN); BOE Technology Group Co., Ltd., Beijing (CN)

(72) Inventors: Yifei Wang, Beijing (CN); Tan Jing, Beijing (CN); Tianliang Liu, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/532,527

(22) Filed: Nov. 22, 2021

(65) Prior Publication Data

US 2022/0163868 A1 May 26, 2022

(30) Foreign Application Priority Data

Nov. 26, 2020 (CN) .......................... 202011346961.X

(51) Int. Cl.
*G03B 7/083* (2021.01)
*H04N 23/73* (2023.01)

(52) U.S. Cl.
CPC ............. *G03B 7/083* (2013.01); *H04N 23/73* (2023.01)

(58) Field of Classification Search
CPC ...... G03B 7/083; H04N 5/2353; H04N 23/73; H04N 25/53; G09G 3/3208
See application file for complete search history.

(56) References Cited

U.S. PATENT DOCUMENTS

| 2004/0151488 | A1 | 8/2004 | Osawa |
| 2016/0078846 | A1 | 3/2016 | Liu et al. |
| 2019/0191153 | A1* | 6/2019 | Speigle ..................... G09G 5/10 |

FOREIGN PATENT DOCUMENTS

| CN | 101102412 A | * | 1/2008 |
| CN | 101102412 A | | 1/2008 |
| CN | 105427785 A | | 3/2016 |
| CN | 108492776 A | | 9/2018 |

(Continued)

OTHER PUBLICATIONS

CN202011346961.X second office action.
CN202011346961.X first office action.

*Primary Examiner* — Ahmed A Berhan
(74) *Attorney, Agent, or Firm* — IPro, PLLC

(57) ABSTRACT

The present disclosure provides an optical compensation method for a display screen, a storage medium and an electronic device, and the method includes: determining a refresh time of a to-be-compensated screen; determining an exposure time as N times the refresh time, wherein N is a positive integer; controlling a camera to shoot the to-be-compensated screen based on the exposure time; acquiring an original image of the to-be-compensated screen captured by the camera; and performing optical compensation on the display effect of the to-be-compensated screen based on the original image. The present disclosure can avoid a split-screen phenomenon of the display effect of the screen after performing optical compensation on the display screen based on the original image.

18 Claims, 4 Drawing Sheets

(56) References Cited

FOREIGN PATENT DOCUMENTS

| | | | |
|---|---|---|---|
| CN | 111739457 | A | 10/2020 |
| CN | 111968582 | A | 11/2020 |
| JP | 2004187287 | A | 7/2004 |

* cited by examiner

OPTICAL COMPENSATION METHOD FOR DISPLAY SCREEN, STORAGE MEDIUM, AND ELECTRONIC DEVICE

CROSS-REFERENCE TO RELATED APPLICATION

This application is based on and claims priority to the Chinese Patent Application No. 202011346961.X, filed on Nov. 26, 2020 and entitled "OPTICAL COMPENSATION METHOD FOR DISPLAY SCREEN, DEVICE, STORAGE MEDIUM, AND ELECTRONIC DEVICE," the disclosure of which is herein incorporated by reference in its entirety.

TECHNICAL FIELD

The present disclosure relates to the field of display technologies, and more particularly, to an optical compensation method for a display screen, a storage medium and an electronic device.

BACKGROUND

In the industry of manufacture of organic light emitting diode (OLED) screens, each screen includes millions or tens of millions of small pixels. Due to purity of the luminescent material and fineness of the manufacturing process, the problem of uneven display luminance is present even in the same screen.

The optical compensation (demura) technology is a technology of compensating on mura occurring for the screen due to mechanisms/processes, luminance information of each pixel in a display screen is primarily acquired by shooting, and optical compensation is performed on display effect of the display screen based on the acquired luminance information.

SUMMARY

Embodiments of the present disclosure provide an optical compensation method for a display screen, a storage medium, and an electronic device.

According to one aspect of the embodiments of the present disclosure, an optical compensation method for a display screen is provided. The method includes: determining a refresh time of a to-be-compensated screen; determining an exposure time as N times the refresh time, wherein N is a positive integer; controlling a camera to shoot the to-be-compensated screen based on the exposure time; acquiring an original image of the to-be-compensated screen captured by the camera; and performing optical compensation on a display effect of the to-be-compensated screen based on the original image.

In some embodiments, determining the refresh time of the to-be-compensated screen includes: determining the refresh time based on a nominal refresh rate of the to-be-compensated screen.

In some embodiments, determining the refresh time of the to-be-compensated screen includes: acquiring a real-time refresh rate of the to-be-compensated screen in the case that the to-be-compensated screen is in a lit state; and determining the refresh time based on the real-time refresh rate of the to-be-compensated screen.

In some embodiments, acquiring the real-time refresh rate of the to-be-compensated screen includes: determining the real-time refresh rate of the to-be-compensated screen based on a tearing effect (TE) signal output by a lighting jig.

In some embodiments, controlling the camera to shoot the to-be-compensated screen based on the exposure time includes: sending the exposure time to the camera such that the camera shoots the to-be-compensated screen based on the exposure time.

In some embodiments, controlling the camera to shoot the to-be-compensated screen based on the exposure time includes: sending a start instruction to the camera, wherein the start instruction is configured to instruct the camera to start shooting the to-be-compensated screen; and sending a stop instruction to the camera, wherein the stop instruction is configured to instruct the camera to stop shooting the to-be-compensated screen; wherein a time interval between the stop instruction and the start instruction is the exposure time.

In some embodiments, performing optical compensation on the display effect of the to-be-compensated screen based on the original image includes: determining luminance information for each pixel in the original image; determining a compensation parameter based on the luminance information; and performing optical compensation on the display effect of the to-be-compensated screen based on the compensation parameter.

According to another aspect of the embodiments of the present disclosure, a storage medium storing a computer program is provided. The computer program, when loaded and run by a processor of an electronic device, causes the electronic device to perform the optical compensation method for the display screen as described above.

According to still another aspect of the embodiments of the present disclosure, an electronic device. The electronic device includes at least a processor and a memory storing a computer program, wherein the processor, when loading and running the computer program, is caused to perform the optical compensation method for the display screen as described above.

Further, the electronic device further includes the camera; wherein the camera is configured to acquire the original image by shoot the to-be-compensated screen under control of the processor.

BRIEF DESCRIPTION OF THE DRAWINGS

For clearer descriptions of the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without any creative efforts.

DETAILED DESCRIPTION

Descriptions will be made below to the exemplary embodiments of the present disclosure with reference to the accompanying drawings. However, it should be understood that the embodiments of the present disclosure are only examples of the present disclosure, which may be implemented in a variety of ways. Well-known and/or repetitive functions and structures are not described in detail to avoid unnecessary or redundant details to obscure the present disclosure. Therefore, the specific structural and functional details in the present disclosure are not intended to be restrictive, but merely serve as the basis and representative basis of the claims to teach those skilled in the art to use the present disclosure in a variety of ways with any substantially appropriate detailed structure.

The original image acquired by shooting the display screen in optical compensation technology has an important effect on the subsequent compensation effect. In the camera shooting process, when the exposure time is short, one or two distinct bright-dark boundaries may appear in the original image acquired by shooting. When a distinct bright-dark boundary is present in the original image shot by the camera, the screen effect displayed by the display screen may appear obvious split-screen phenomenon after the optical compensation, thereby severely affecting the quality of the screen.

The distinct bright-dark boundary in the original image is caused by the following aspects. The process of displaying image on the screen is refreshed by progressive scanning. That is, pixels are charged line by line, and in a charged pixel area, the pixel appears as a dark bar. The camera takes a picture with the accumulated brightness of each area during the exposure time. If the numbers of charging times corresponding to the rows of pixels are different during the exposure time, the accumulated brightness may also different.

Figure 1:
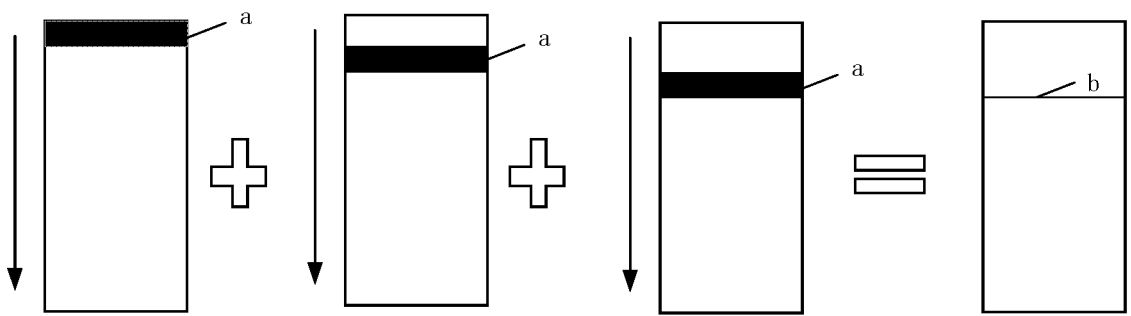
FIG. 1 illustrates a first possible display effect of an original image in the related art.

For example, as shown in FIG. 1, in the case that the exposure time is equal to charging duration for three rows of pixels on the display screen, and scanning starts from the first row of pixels in response to the start of the exposure time, the first three rows of pixels, in the exposure time, appear a dark bar in sequence, correspondingly in the acquired original image, an area where the first three rows of pixels are located is darker than an area where other pixels are located, and a bright-dark boundary b is present between the area where the first three rows of pixels are located and the area where other pixels are located. The image area above the bright-dark boundary b is relatively dark.

Figure 2:
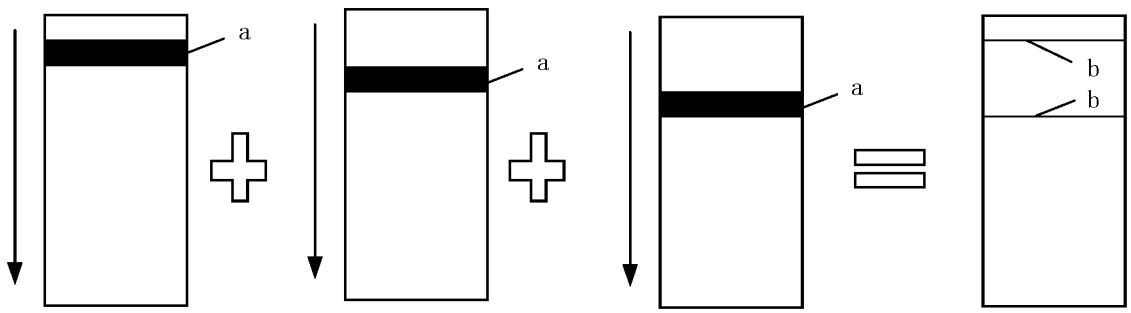
FIG. 2 illustrates a second possible display effect of the original image in the related art.

For another example, as shown in FIG. 2, in the case that the exposure time is equal to charging duration for three rows of pixels on the display screen, and scanning starts from the second row of pixels in response to the start of the exposure time, pixels from the second row to the fourth row, in the exposure time, appear a dark bar a in sequence, and correspondingly in the acquired original image, an area where the pixels from the second row to the fourth row are located is darker than an area where other pixels are located, and two bright-dark boundaries b are present between the area where pixels from second row to fourth row are located and the area where other pixels are located. An area between the two bright-dark boundaries b is relatively dark.

Arrows in FIG. 1 and FIG. 2 indicate a scanning direction.

Figure 3:
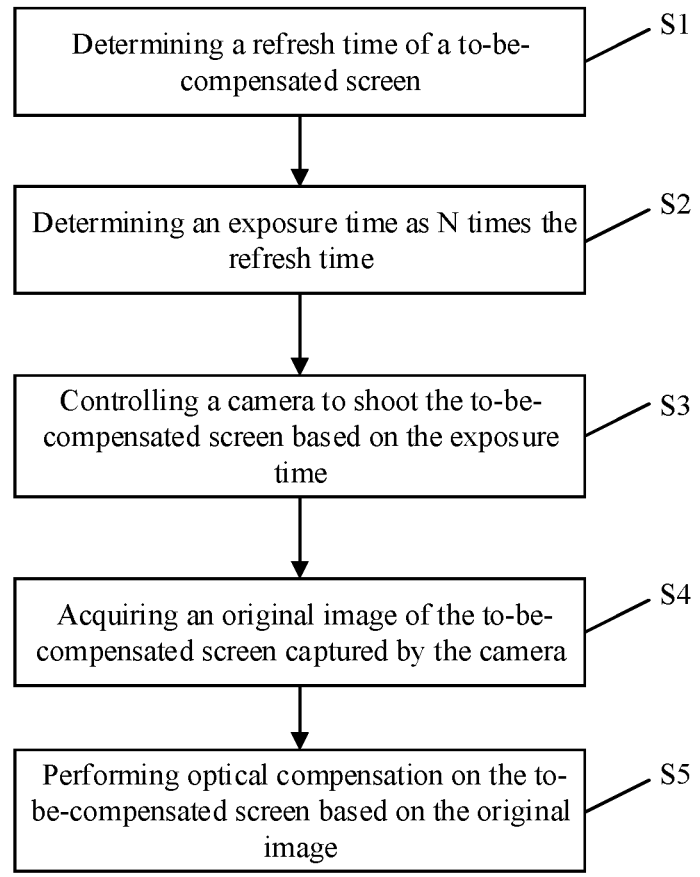
FIG. 3 is a flowchart showing an optical compensation method for a display screen according to an embodiment of the present disclosure.

An embodiment of the present disclosure provides an optical compensation method for a display screen. The method is mainly applicable to an optical compensation device. Normally, the device includes a computer or server for calculation and processing, and a camera for image shooting, and data can be transmitted between the two in a wired or wireless manner. The flowchart of the method is shown in FIG. 3, which mainly includes steps S1 to S5:

In step S1, the refresh time of the to-be-compensated screen is determined.

The to-be-compensated screen is a display screen that needs to perform optical compensation process. When displaying, the display screen may make a number of redraws on current display content every second, and the number of redraws is a refresh rate (Frequency) of the display screen (also known as vertical refresh rate). Correspondingly, a time when the display content is redrawn once is called the refresh time (Frame), and a relationship between frequency and frame is:

$$\text{Frame}=1/\text{Frequency}. \quad \text{formula (1)}$$

The corresponding refresh time may be determined based on a nominal refresh rate of the to-be-compensated screen, when acquiring the refresh time of the to-be-compensated screen. For each screen, it has a nominal refresh rate. In the lighted state, the screen redraws the displayed content at the nominal refresh rate, usually 60 Hz or 90 Hz. That is, the display screen refreshes 60 or 90 times per second. In this case, based on the nominal refresh rate of the to-be-compensated screen and formula (1), the refresh time of the to-be-compensated screen can be determined, that is, $1/60$ or $1/90$.

It should be understood that the nominal refresh rate of 60 Hz or 90 Hz is merely the nominal refresh rate commonly used in the current display screen. In actual use, the nominal refresh rate of the display screen may be adjusted according to screen material, use environment, actual display requirements and the like, which are not limited in the embodiments.

As output of an oscillator (OSC) in a control chip of the display screen may fluctuate between chips, and a fluctuation rate is usually about 1%, which causes a fluctuation of about 1% in the refresh rate of the screen. In order to prevent the inaccurate calculation of the exposure time caused by the fluctuation of the refresh rate to prevent impacts caused to the subsequent compensation effect, according to the embodiments, a real-time refresh rate of the to-be-compensated screen is acquired in the case that the to-be-compensated screen is in a lit state, and then based on the acquired real-time refresh rate combined with formula (1), the refresh time of the to-be-compensated screen is determined, such that the calculation accuracy is improved and the compensation effect is optimized.

In some embodiments, the real-time refresh rate of the to-be-compensated screen may be determined based on a tearing effect (TE) signal output by an output pin of a lighting jig. Before the display screen leaves the factory, the lighting jig is usually used for lighting detection to detect whether there are bright or dark spots on the display screen. Upon the display screen being installed on the lighting jig, an output terminal of the lighting jig may be connected to a data input terminal of the compensation device to obtain the TE signal output by the lighting jig in real time during the lighting detection process, then the real-time refresh rate of the current screen may be analyzed based on the TE signal, and finally the refresh time of the screen is calculated based on the real-time refresh rate by formula (1).

In practice, the TE signal is equivalent to a synchronization signal, and its frequency is consistent with the real-time refresh rate of the screen. Therefore, the real-time refresh rate of the current screen can be parsed based on the TE signal.

In step S2, the exposure time is determined as N times the refresh time.

In step S3, the exposure time is sent to the camera of the compensation device, such that the camera may shoot the to-be-compensated screen based on the exposure time.

The exposure time is a time interval between a shutter opening and closing of the camera. The longer the shutter is open, the higher the luminance of the final image, and vice versa. Therefore, the luminance acquired by the camera during the exposure time is continuously accumulated. When the display content of the to-be-compensated screen achieves a complete redraw, the brightness of any pixel area captured by the camera should be the luminance of the corresponding pixel area being lit once, and no pixel area that is lit twice or not lit is present. Therefore, in the embodiments, the exposure time is adjusted to N times the refresh time of the to-be-compensated screen, wherein N is a positive integer. That is, in the time period when the shutter is open, the number of times that the pixels in all pixel areas are lit is the same (i.e. N times). That is, the luminance accumulation times of the pixels in all pixel areas are the same, and even in the case that differences in luminance are present between different pixels, the corresponding luminance differences presented in the original image are superimposed in the same geometric multiples and no bright-dark boundary in the original image due to the screen refresh, thereby avoiding the split-screen phenomenon of the screen upon optical compensation.

It should be noted that the number of N in the embodiments may be adjusted according to camera performance, screen parameters, and actual display requirements. The embodiments do not specifically limit the number of N, as long as it is a positive integer. Exemplarily, the number of N ranges from 1 to 30.

Figure 4:
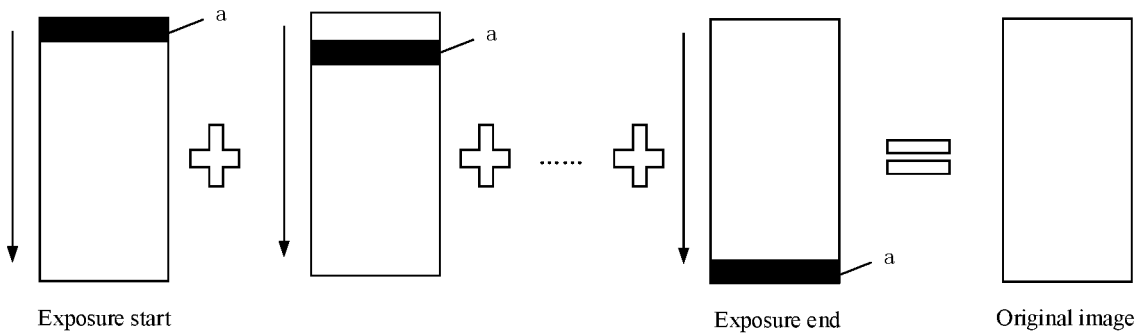
FIG. 4 is a schematic diagram of a photographic effect according to an embodiment of the present disclosure.
Figure 5:
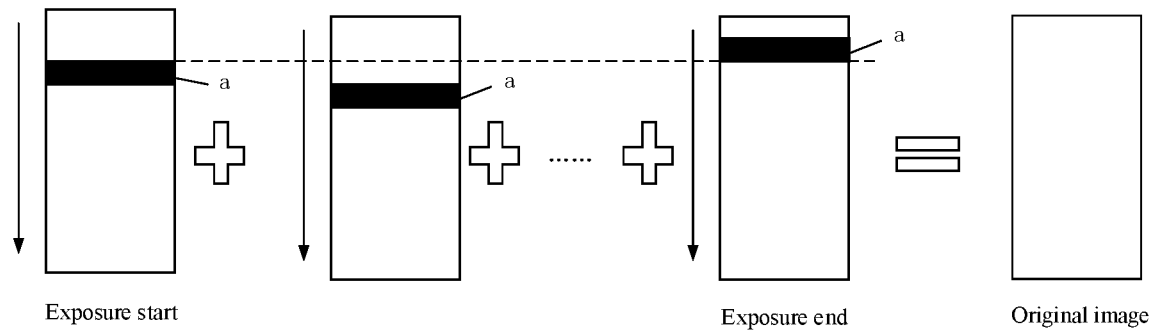
FIG. 5 is a schematic diagram of another photographic effect according to an embodiment of the present disclosure.

In the case that the camera of the optical compensation device receives the adjusted exposure time, the camera shoots the current display content of the to-be-compensated screen based on the exposure time. As shown in FIG. 4, at the beginning of the exposure, the uppermost M (for example, equal to 1) row of pixels on the to-be-compensated screen start refreshing (corresponding to the black horizontal bar in the leftmost example in FIG. 4) and appear as a dark bar a; and at the end of the exposure, the lowermost M row of pixels on the to-be-compensated screen stop refreshing and appear as dark bar a. The final result of the original image is shown in the rightmost example in FIG. 4. At a moment when the shutter of the camera is opened, the current refresh position of the to-be-compensated screen may not be the uppermost of the screen, as long as all pixels are refreshed the same number of times when the shutter is closed. For example, as shown in FIG. 5, at the beginning of the exposure, pixels in third row start refreshing, and the pixels in the third row appear as dark bar a; and at the end of the exposure, pixels in second row stop refreshing, and the pixels in the second row appear as dark bar a.

In some embodiments, step S3 may be replaced by: sending the start instruction to the camera, wherein the start instruction is configured to instruct the camera to start shooting the to-be-compensated screen; and sending the stop instruction to the camera, wherein the stop instruction is configured to instruct the camera to stop shooting the to-be-compensated screen; wherein a time interval between the stop instruction and the start instruction is the exposure time.

The exposure time of the camera is controlled by the start instruction and the stop instruction, and the camera can control the exposure time by passively executing the instruction, which helps to reduce the requirements on the camera.

In step S4, the original image of the to-be-compensated screen captured by the camera is acquired.

In step S5, optical compensation is performed on a display effect of the to-be-compensated screen based on the original image.

In some embodiments, step S5 includes: determining luminance information for each pixel in the original image; determining compensation parameters based on the luminance information; and performing optical compensation on a display effect of the to-be-compensated screen based on the original image.

The camera shoots the current display content of the to-be-compensated screen based on the adjusted exposure time, forms the original image of the to-be-compensated screen, and sends it back to the optical compensation device. The optical compensation device recognizes and analyzes the luminance information of each pixel in the original image based on a compensation algorithm, and performs Optical compensation on pixels with uneven luminance to form compensation parameters. Finally, based on the compensation parameters, an input display content of the to-be-compensated screen is adjusted, and the display effect of the display screen is adjusted to balance the pixel luminance at each position and improve the quality of the screen.

In the case that the display effect of the to-be-compensated screen is compensated based on the compensation parameters, the lower luminance part can be improved by adjusting the display parameters (gamma) or adjusting input grayscale values corresponding to the lower luminance part of the pixel. It should be understood that, in addition to the above adjustment methods, other methods for adjusting the display effect may also be used in actual optical compensation as long as the display effect is optimized.

In the embodiments, by adjusting the exposure time of the camera to an integer multiple of the refresh time of one frame of the screen, and ensuring all pixel areas of the entire screen have undergone a complete one or several refreshes within the exposure time of the camera, the luminance accumulation of the all pixel areas is the same, and no bright-dark boundary is present in the original image due to screen refresh, thereby avoiding the split-screen phenomenon of the screen upon optical compensation on the original image.

Figure 6:
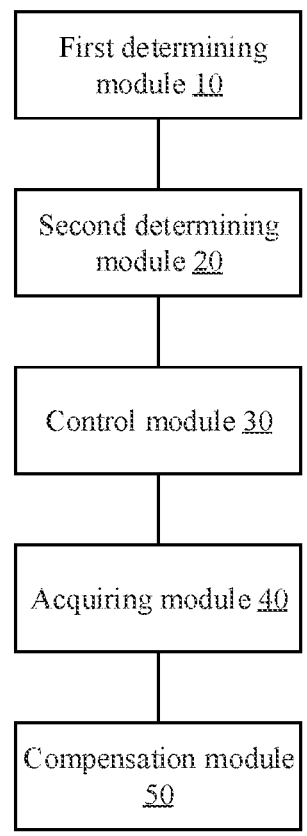
FIG. 6 is a schematic structural diagram of an optical compensation device for a display screen according to an embodiment of the present disclosure.

An embodiment of the present disclosure further provides an optical compensation apparatus for a display screen. The optical compensation apparatus may be equipped in any computer or server with computing and processing functions. Meanwhile, the computer and the server are also connected to a camera for shooting a to-be-compensated screen, and a schematic structural diagram of the optical compensation apparatus is shown in FIG. 6. The optical compensation apparatus mainly includes: a first determining module 10, configured to determine a refresh time of a to-be-compensated screen; a second determining module 20, configured to determine a exposure frame as N times the refresh time, wherein N is a positive integer; a control module 30, configured to control the camera to shoot the to-be-compensated screen based on the exposure time; an acquiring module 40, configured to acquire an original image of the to-be-compensated screen captured by the camera; a compensation module 50, configured to perform optical compensation on a display effect of the to-be-compensated screen based on the original image.

In some embodiments, in response to acquiring the refresh time of the to-be-compensated screen, the first determining module 10 may determine the corresponding refresh time based on a nominal refresh rate of the to-be-compensated screen.

In some embodiments, the first determining module 10 may also acquire a real-time refresh rate of the to-be-compensated screen in the case that the to-be-compensated screen is a lit state, and then determine the refresh time of the to-be-compensated screen based on the acquired real-time refresh rate combined with formula (1), such that the calculation accuracy is improved and the compensation effect is optimized.

In some embodiments, the real-time refresh rate of the to-be-compensated screen may be determined based on a TE signal output by a lighting jig.

In some embodiments, the control module 30 is configured to send the exposure time to the camera of the optical compensation device, such that the camera shoots the to-be-compensated screen based on the exposure time.

In some embodiments, the control module 30 is configured to send a start instruction to the camera, wherein the start instruction is configured to instruct the camera to start shooting the to-be-compensated screen; and send a stop instruction to the camera, wherein the stop instruction is configured to instruct the camera to stop shooting the to-be-compensated screen; wherein a time interval between the stop instruction and the start instruction is the exposure time.

In some embodiments, the compensation module 50 is configured to determine luminance information of each pixel in the original image; and determine compensation parameters based on the luminance information and perform optical compensation on the display effect of the to-be-compensated screen based on the compensation parameters.

In practice, functions of the first determination module 10, the second determination module 20, the control module 30, the acquiring module 40, and the compensation module 50 disclosed in the embodiments may all be implemented by one or more processors of a computer or a server. The embodiments do not limit the specific code executed by the processor when implementing functions of the corresponding module, as long as the corresponding function can be realized.

It should be noted that when the optical compensation apparatus according to the above embodiments performs optical compensation on the to-be-compensated screen, division of the above functional modules is merely used as examples for illustration. In actual use, the above functions may be allocated to different function modules to perform according to needs. That is, internal structure of the device is divided into different functional modules to perform all or part of the functions described above. In addition, the optical compensation device provided in the above embodiments and the optical compensation method embodiments belong to the same concept, and the specific implementation process is shown in the method embodiments in detail, which will not be repeated here.

In the embodiments of the present disclosure, by adjusting the exposure time of the camera to an integer multiple of the refresh time of one frame of the screen, and ensuring all pixel areas of the entire screen have undergone a complete one or several times of refresh within the exposure time of the camera, the luminance accumulation of the all pixels area is the same, and no bright-dark boundary may be present in the original image due to screen refresh, thereby avoiding a split-screen phenomenon of the display effect of the screen after performing optical compensation on the original image.

An embodiment of the present disclosure further provides a storage medium equipped in any computer or server with computing and processing functions. Meanwhile, the computer and the server are also connected to a camera for shooting a to-be-compensated screen. The storage medium is specifically a non-transitory computer-readable storage medium storing a computer program. The computer program, when loaded and run by a processor of an electronic device, causes the electronic device to perform the method according to any embodiment of the present disclosure.

In some embodiments, the computer program, when loaded and run by the processor of the electronic device, causes the electronic device to execute instructions for: determining a refresh time of a to-be-compensated screen; determining an exposure time as N times the refresh time, wherein N is a positive integer; controlling a camera to shoot the to-be-compensated screen based on the exposure time; acquiring an original image of the to-be-compensated screen shot by the camera; and performing optical compensation on the display effect of the to-be-compensated screen based on the original image.

In some embodiments, the computer program, when loaded and run by the processor of the electronic device to determine the refresh time of the to-be-compensated screen, causes the electronic device to execute an instruction for: determining the refresh time based on the nominal refresh rate of the to-be-compensated screen.

In some embodiments, the computer program, when loaded and run by the processor of the electronic device to determine the refresh time of the to-be-compensated screen, causes the electronic device to execute instructions for: acquiring a real-time refresh rate of the to-be-compensated screen when the to-be-compensated screen is in a lit state; and determining the refresh time based on the real-time refresh rate of the to-be-compensated screen.

In some embodiments, the computer program, when loaded and run by the processor of the electronic device to determine the real-time refresh rate of the to-be-compensated screen, causes the electronic device to execute an instruction for: determining the real-time refresh rate of the to-be-compensated screen based on a tearing effect (TE) signal output by a lighting jig.

In some embodiments, the computer program, when loaded and run by the processor of the electronic device to control the camera to shoot the to-be-compensated screen based on the exposure time, causes the electronic device to execute an instruction for: sending the exposure time to the camera of an optical compensation device, such that the camera shoots the to-be-compensated screen based on the exposure time.

In some embodiments, the computer program, when loaded and run by the processor of the electronic device to control the camera to shoot the to-be-compensated screen based on the exposure time, causes the electronic device to execute instructions for: sending a start instruction to the camera, wherein the start instruction is configured to instruct the camera to start shooting the to-be-compensated screen; and sending a stop instruction to the camera, wherein the stop instruction is configured to instruct the camera to stop shooting the to-be-compensated screen; wherein a time interval between the stop instruction and the start instruction is the exposure time.

In some embodiments, the computer program, when loaded and run by the processor of the electronic device to perform optical compensation on the display effect of the to-be-compensated screen based on the original image, causes the electronic device to execute instructions for: determining luminance information for each pixel in the original image; determining compensation parameters based on the luminance information; and performing optical compensation on the display effect of the to-be-compensated screen based on the compensation parameter.

In the embodiments, by adjusting the exposure time of the camera to an integer multiple of the refresh time of one frame of the screen, and ensuring all pixel areas of the entire screen have undergone a complete one or several times of refresh within the exposure time of the camera, the luminance accumulation of the all pixel areas is the same, and no bright-dark boundary is present in the original image due to screen refresh, thereby avoiding a split-screen phenomenon of the screen after performing optical compensation on the original image.

Figure 7:
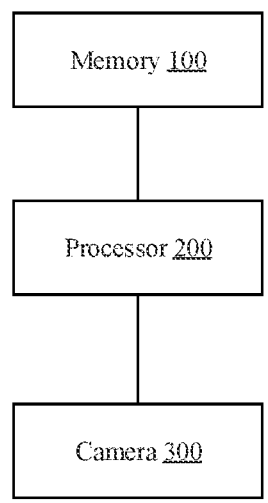
FIG. 7 is a schematic structural diagram of an electronic device according to an embodiment of the present disclosure.

An embodiment of the present disclosure further provides an electronic device. The electronic device may be used as an optical compensation device, and a schematic structural diagram of the electronic device is shown in FIG. 7. The electronic device includes at least a memory 100 and a processor 200. The memory 100 stores a computer program, and the processor 200, when loading and running the computer program in the memory 100, is caused to perform the method according to any embodiment of the present disclosure.

In some embodiments, the processor 200, when loading and running the computer program stored in the memory 100, is caused to execute instructions for: determining a refresh time of a to-be-compensated screen; determining an exposure time as N times the refresh time, wherein N is a positive integer; controlling a camera to shoot the to-be-compensated screen based on the exposure time; acquiring an original image of the to-be-compensated screen captured by the camera; and performing optical compensation on a display effect of the to-be-compensated screen based on the original image.

In some embodiments, the processor 200, when loading and running the computer program stored in the memory 100 to determine the refresh time of the to-be-compensated screen, is caused to execute an instruction for: determining the refresh time based on the nominal refresh rate of the to-be-compensated screen.

In some embodiments, the processor 200, when loading and running the computer program stored in the memory 100 to determine the refresh time of the to-be-compensated screen, is caused to execute instructions for: acquiring a real-time refresh rate of the to-be-compensated screen when the to-be-compensated screen is in a lit state; and determining the refresh time based on the real-time refresh rate of the to-be-compensated screen.

In some embodiments, the processor 200, when loading and running the computer program stored in the memory 100 to determine the real-time refresh rate of the to-be-compensated screen, is caused to execute an instruction for: determining the real-time refresh rate of the to-be-compensated screen based on a tearing effect (TE) signal output by a lighting jig.

In some embodiments, the processor 200, when loading and running the computer program stored in the memory 100 to control the camera to shoot the to-be-compensated screen based on the exposure time, is caused to execute an instruction for: sending the exposure time to the camera of an optical compensation device, such that the camera shoots the to-be-compensated screen based on the exposure time.

In some embodiments, the processor 200, when loading and running the computer program stored in the memory 100 to control the camera to shoot the to-be-compensated screen based on the exposure time, is caused to execute instructions for: sending a start instruction to the camera, wherein the start instruction is configured to instruct the camera to start shooting the to-be-compensated screen; and sending a stop instruction to the camera, wherein the stop instruction is configured to instruct the camera to stop shooting the to-be-compensated screen; wherein a time interval between the stop instruction and the start instruction is the exposure time.

In some embodiments, the processor 200, when loading and running the computer program stored in the memory 100 to perform optical compensation on the display effect of the to-be-compensated screen based on the original image, is caused to execute instructions for: determining luminance information for each pixel in the original image; determining compensation parameters based on the luminance information; and performing optical compensation on the display effect of the to-be-compensated screen based on the compensation parameter.

In this case, the electronic device in the embodiments should further include a camera 300, wherein the camera 300 is configured to shoot the to-be-compensated screen under the control of the processor 200. For example, the camera 300 is capable of communicating with the processor 200 in a wired or wireless manner. The processor 200 sends the determined exposure time to the camera 300, and the camera 300 shoots the to-be-compensated screen based on the exposure time in response to receiving the exposure time sent by the processor 200, so as to acquire the original image and send the original image to the processor 200 for subsequent processing.

In these embodiments, by adjusting the exposure time of the camera to an integer multiple of the refresh time of one frame of the screen, it is ensured that within the exposure time of the camera, all pixel areas of the entire screen have experienced a complete one or several times of refresh to achieve the brightness accumulation of all the pixel areas is the same, and no bright-dark boundary may be present in the original image due to the screen refresh, thereby avoiding a split-screen phenomenon in the display screen after performing optical compensation on the original image.

Described above are the detailed descriptions of various embodiments of the present disclosure, and the present disclosure is not limited to these specific embodiments. Those skilled in the art may derive a plurality of variants and modifications based on the concept of the present disclosure, and these variants and modifications should fall within the scope of protection of the present disclosure.

What is claimed is:

1. An optical compensation method for a display screen, comprising:
    determining a refresh time of a to-be-compensated screen;
    determining an exposure time as N times the refresh time, wherein N is a positive integer;
    controlling a camera to shoot the to-be-compensated screen based on the exposure time;
    acquiring an original image of the to-be-compensated screen captured by the camera;
    identifying and analyzing luminance of pixels at each position in the original image based on a compensation algorithm to determine luminance information of each pixel in the original image;

determining a compensation parameter based on the luminance information; and adjusting display parameters based on the compensation parameter to equalize the luminance of the pixels at each position in the original image; or adjusting input grayscale values corresponding to pixels with lower luminance based on the compensation parameter to increase the luminance of the pixels with lower luminance, so as to equalize the luminance of the pixels at each position in the original image.

2. The method according to claim 1, wherein determining the refresh time of the to-be-compensated screen comprises:

determining the refresh time based on a nominal refresh rate of the to-be-compensated screen.

3. The method according to claim 1, wherein determining the refresh time of the to-be-compensated screen comprises:

acquiring a real-time refresh rate of the to-be-compensated screen in the case that the to-be-compensated screen is in a lit state; and determining the refresh time based on the real-time refresh rate of the to-be-compensated screen.

4. The method according to claim 3, wherein acquiring the real-time refresh rate of the to-be-compensated screen comprises:

determining the real-time refresh rate of the to-be-compensated screen based on a tearing effect (TE) signal output by a lighting jig.

5. The method according to claim 1, wherein controlling the camera to shoot the to-be-compensated screen based on the exposure time comprises:

sending the exposure time to the camera such that the camera shoots the to-be-compensated screen based on the exposure time.

6. The method according to claim 1, wherein controlling the camera to shoot the to-be-compensated screen based on the exposure time comprises:

sending a start instruction to the camera, wherein the start instruction is configured to instruct the camera to start shooting the to-be-compensated screen; and sending a stop instruction to the camera, wherein the stop instruction is configured to instruct the camera to stop shooting the to-be-compensated screen;

wherein a time interval between the stop instruction and the start instruction is the exposure time.

7. An electronic device, comprising at least a processor and a memory storing a computer program, wherein the processor, when loading and running the computer program, is caused to execute instructions for:

determining a refresh time of a to-be-compensated screen;

determining an exposure time as N times the refresh time, wherein N is a positive integer;

controlling a camera to shoot the to-be-compensated screen based on the exposure time;

acquiring an original image of the to-be-compensated screen captured by the camera;

identifying and analyzing luminance of pixels at each position in the original image based on a compensation algorithm to determine luminance information of each pixel in the original image;

determining a compensation parameter based on the luminance information; and adjusting display parameters based on the compensation parameter to equalize the luminance of the pixels at each position in the original image; or adjusting input grayscale values corresponding to pixels with lower luminance based on the compensation parameter to increase the luminance of the pixels with lower luminance, so as to equalize the luminance of the pixels at each position in the original image.

8. The electronic device according to claim 7, wherein the processor, when loading and running the computer program, is further caused to execute an instruction for:

determining the refresh time based on a nominal refresh rate of the to-be-compensated screen.

9. The electronic device according to claim 7, wherein the processor, when loading and running the computer program, is further caused to execute instructions for:

acquiring a real-time refresh rate of the to-be-compensated screen in the case that the to-be-compensated screen is in a lit state; and determining the refresh time based on the real-time refresh rate of the to-be-compensated screen.

10. The electronic device according to claim 9, wherein the processor, when loading and running the computer program, is further caused to execute an instruction for:

determining the real-time refresh rate of the to-be-compensated screen based on a tearing effect (TE) signal output by a lighting jig.

11. The electronic device according to claim 9, wherein the processor, when loading and running the computer program, is further caused to execute an instruction for:

sending the exposure time to the camera such that the camera shoots the to-be-compensated screen based on the exposure time.

12. The electronic device according to claim 9, wherein the processor, when loading and running the computer program, is further caused to execute instructions for:

sending a start instruction to the camera, wherein the start instruction is configured to instruct the camera to start shooting the to-be-compensated screen; and sending a stop instruction to the camera, wherein the stop instruction is configured to instruct the camera to stop shooting the to-be-compensated screen;

wherein a time interval between the stop instruction and the start instruction is the exposure time.

13. The electronic device according to claim 9, further comprising the camera; wherein the camera is configured to acquire the original image by shooting the to-be-compensated screen under control of the processor.

14. A non-transitory computer-readable storage medium, storing a computer program, wherein the computer program, when loaded and run by a processor of an electronic device, causes the electronic device to execute instructions for:

determining a refresh time of a to-be-compensated screen;

determining an exposure time as N times the refresh time, wherein N is a positive integer;

controlling a camera to shoot the to-be-compensated screen based on the exposure time;

acquiring an original image of the to-be-compensated screen captured by the camera;

identifying and analyzing luminance of pixels at each position in the original image based on a compensation algorithm to determine luminance information of each pixel in the original image;

determining a compensation parameter based on the luminance information; and adjusting display parameters based on the compensation parameter to equalize the luminance of the pixels at each position in the original image; or adjusting input grayscale values corresponding to pixels with lower luminance based on the compensation parameter to increase the luminance of the pixels with lower luminance, so as to equalize the luminance of the pixels at each position in the original image.

15. The non-transitory computer-readable storage medium according to claim 14, wherein the computer program, when loaded and run by the processor of the electronic device, further causes the electronic device to execute an instruction for:

determining the refresh time based on a rated refresh rate of the to-be-compensated screen.

16. The non-transitory computer-readable storage medium according to claim 14, wherein the computer program, when loaded and run by the processor of the electronic device, further causes the electronic device to execute instructions for:

acquiring a real-time refresh rate of the to-be-compensated screen in the case that the to-be-compensated screen is in a lit state; and determining the refresh time based on the real-time refresh rate of the to-be-compensated screen.

17. The non-transitory computer-readable storage medium according to claim 14, wherein the computer program, when loaded and run by the processor of the electronic device, further causes the electronic device to execute an instruction for:

determining the real-time refresh rate of the to-be-compensated screen based on a tearing effect (TE) signal output by a lighting jig.

18. The non-transitory computer-readable storage medium according to claim 14, wherein the computer program, when loaded and run by the processor of the electronic device, further causes the electronic device to execute an instruction for:

sending the exposure time to the camera such that the camera shoots the to-be-compensated screen based on the exposure time.

* * * * *